United States Patent
Kim et al.

(10) Patent No.: US 9,858,684 B2
(45) Date of Patent: Jan. 2, 2018

(54) IMAGE PROCESSING METHOD AND APPARATUS FOR CALIBRATING DEPTH OF DEPTH SENSOR

(71) Applicant: ELECTRONICS AND TELECOMMUNICATIONS RESEARCH INSTITUTE, Daejeon (KR)

(72) Inventors: Jae-Hean Kim, Yongin-si (KR); Chang-Woo Chu, Daejeon (KR); Young-Mi Cha, Daejeon (KR); Jin-Sung Choi, Daejeon (KR); Bon-Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 213 days.

(21) Appl. No.: 14/444,030

(22) Filed: Jul. 28, 2014

(65) Prior Publication Data

US 2015/0279016 A1  Oct. 1, 2015

(30) Foreign Application Priority Data

Mar. 27, 2014  (KR) .................. 10-2014-0036346

(51) Int. Cl.
| | | |
|---|---|---|
| G06K 9/00 | (2006.01) | |
| G06T 7/80 | (2017.01) | |
| H04N 13/02 | (2006.01) | |
| G06T 7/521 | (2017.01) | |

(52) U.S. Cl.
CPC ............... *G06T 7/85* (2017.01); *G06T 7/521* (2017.01); *G06T 7/80* (2017.01); *H04N 13/0246* (2013.01);
(Continued)

(58) Field of Classification Search
None
See application file for complete search history.

(56) References Cited

U.S. PATENT DOCUMENTS

| 8,405,717 B2 | 3/2013 | Kim et al. | |
| 2004/0005092 A1* | 1/2004 | Tomasi | G01B 11/25 382/154 |

(Continued)

OTHER PUBLICATIONS

Ouellet, Jean-Nicolas, Félix Rochette, and Patrick Hébert. "Geometric calibration of a structured light system using circular control points." 3D Data Processing, Visualization and Transmission. 2008. 8 pages.*

(Continued)

*Primary Examiner* — Ryan P Potts
(74) *Attorney, Agent, or Firm* — LRK Patent Law Firm

(57) ABSTRACT

An image processing apparatus and method for calibrating a depth of a depth sensor. The image processing method may include obtaining a depth image of a target object captured by a depth sensor and a color image of the target object captured by a color camera; and calibrating a depth of the depth sensor by calibrating a geometrical relation between a projector and a depth camera, which are included in the depth sensor, based the obtained depth and color images and calculating a correct feature point on an image plane of the depth camera that corresponds to a feature point of an image plane of the projector.

8 Claims, 5 Drawing Sheets

(52) U.S. Cl.
CPC ..... *H04N 13/0253* (2013.01); *H04N 13/0271* (2013.01); *G06T 2207/10024* (2013.01); *G06T 2207/10028* (2013.01); *H04N 2213/003* (2013.01)

(56) References Cited

U.S. PATENT DOCUMENTS

| | | | | |
|---|---|---|---|---|
| 2009/0245690 | A1* | 10/2009 | Li | G06T 7/80 |
| | | | | 382/285 |
| 2010/0034429 | A1* | 2/2010 | Drouin | G06T 7/521 |
| | | | | 382/108 |
| 2013/0010079 | A1* | 1/2013 | Zhang | H04N 13/0207 |
| | | | | 348/47 |
| 2013/0088575 | A1* | 4/2013 | Park | G06T 7/0057 |
| | | | | 348/46 |

OTHER PUBLICATIONS

Smisek, Jan, Michal Jancosek, and Tomas Pajdla. "3D with Kinect." 2011 IEEE International Conference on Computer Vision Workshops (ICCV Workshops). 7 pages.*

Kim, Jae-Hean, Jin Sung Choi, and Bon-Ki Koo. "Simultaneous Color Camera and Depth Sensor Calibration with Correction of Triangulation Errors." Advances in Visual Computing. Springer Berlin Heidelberg, 2013. 301-311. 15 pages.*

Herrera, Daniel, Juho Kannala, and Janne Heikkilä. "Accurate and practical calibration of a depth and color camera pair." Computer analysis of images and patterns. Springer Berlin Heidelberg, 2011. 9 pages.*

Chow, Jacky CK, and Derek D. Lichti. "Photogrammetric bundle adjustment with self-calibration of the PrimeSense 3D camera technology: Microsoft Kinect." IEEE Access 1 (2013): 465-474. 10 pages.*

Cha Zhang et al., "Calibration Between Depth and Color Sensors for Commodity Depth Cameras", Communication and Collaboration Systems Group, Microsoft Research.

Daniel Herrera C. et al., "Joint Depth and Color Camera Calibration with Distortion Correction", pp. 1-8.

* cited by examiner

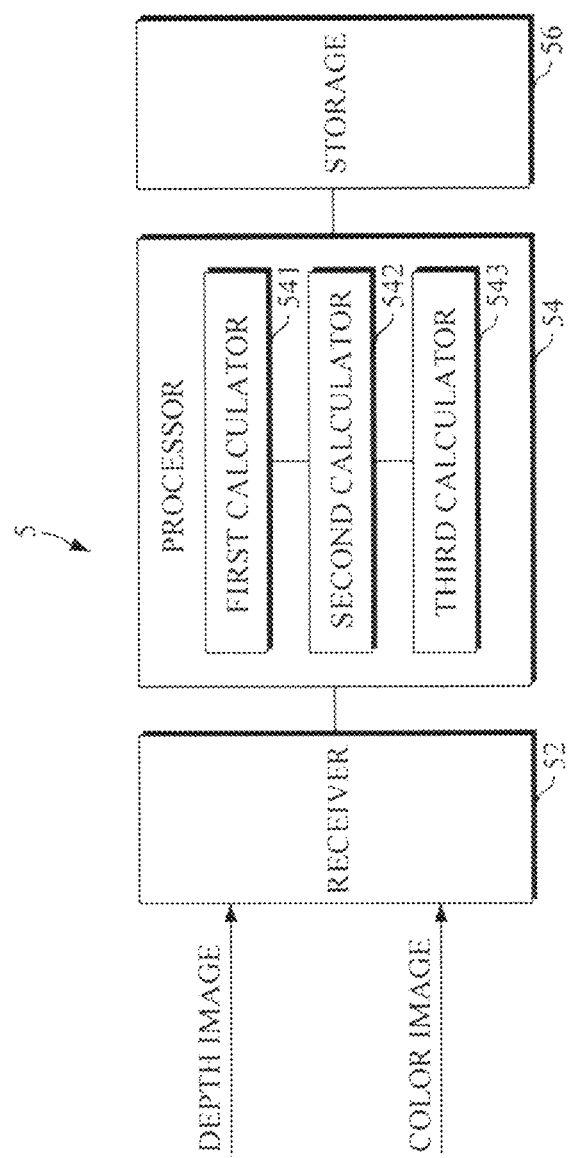

IMAGE PROCESSING METHOD AND APPARATUS FOR CALIBRATING DEPTH OF DEPTH SENSOR

CROSS-REFERENCE TO RELATED APPLICATION(S)

This application claims priority from Korean Patent Application No. 10-2014-0036346, filed on Mar. 27, 2014, in the Korean Intellectual Property Office, the disclosure of which is incorporated herein by reference in its entirety.

BACKGROUND

1. Field

The following description relates to image processing, and more particularly, to camera calibration.

2. Description of the Related Art

A structured light-based depth sensor, such as KINECT from, MICROSOFT which uses triangulation to measure a depth, may have an error in the obtained depth due to the assembly tolerance in production of the depth sensor, or errors in optical elements thereof. When extracting texture of a target object using a color camera simultaneously with the depth sensor, the texture information of a three-dimensionally restored target object may include errors unless the errors of the depth of the depth sensor is corrected, even when a geometrical relation between the depth sensor and the color camera is accurately computed. In an example depth error correction method, a measured depth value is corrected through linear transformation of stereo disparity or depth value from the depth sensor. Such a method is, however, limited in accuracy because the models used for the method are based on approximation.

SUMMARY

The following disclosure provides an image processing apparatus and method for correcting errors in a depth image which is obtained by using both depth and color cameras simultaneously.

In one general aspect, there is provided an image processing method for calibrating a depth of a depth sensor, the image processing method including: obtaining a depth image of a target object captured by a depth sensor and a color image of the target object captured by a color camera; and calibrating a depth of the depth sensor by calibrating a geometrical relation between a projector and a depth camera, which are included in the depth sensor, based on the obtained depth and color images, and calculating a correct feature point on an image plane of the depth camera that corresponds to a feature point of an image plane of the projector.

In another general aspect, there is provided an image processing apparatus for calibrating a depth sensor, the image processing apparatus including: a receiver configured to obtain a depth image of a target object captured by a depth sensor and a color image of the target object captured by a color camera; and a processor configured to correct a depth of the depth sensor by calibrating a geometrical relation between a projector and a depth camera, which are included in the depth sensor, based on the obtained depth and color images, and calculate a correct feature point on an image plane of the depth camera that corresponds to a feature point of an image plane of the projector.

Other features and aspects will be apparent from the following detailed description, the drawings, and the claims.

BRIEF DESCRIPTION OF THE DRAWINGS

FIG. 5 is a diagram illustrating an image processing apparatus according to an exemplary embodiment.

Figure 1:
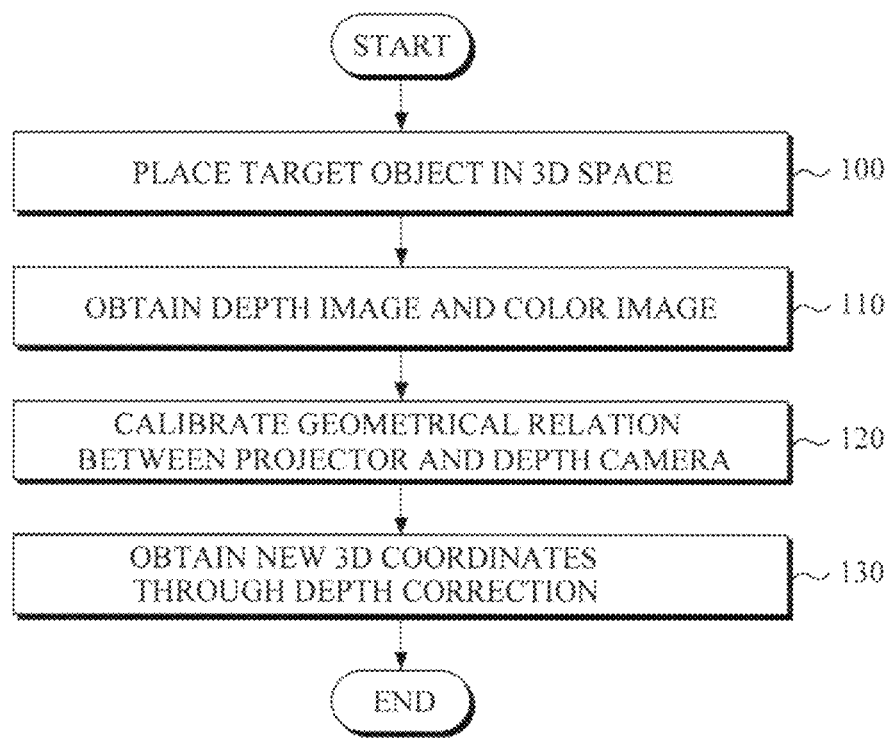
FIG. 1 is a flowchart illustrating an image processing method for depth calibration of a depth sensor according an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a flowchart illustrating an image processing method for depth calibration of a depth sensor according an exemplary embodiment.

Referring to FIG. 1, a target object is placed in a three-dimensional (3D) space for camera calibration in 100. In 110, a depth image of the target object is obtained using a depth camera of a depth sensor, and a color image of the target object is obtained using a color camera. At this time, the depth image and the color image may be simultaneously obtained in real time by the depth camera and the color camera. The color camera may be high resolution, and the depth camera may obtain a high-quality depth map.

The depth sensor that calculates the depth by triangulation may include a structured light projector and a camera that captures the structured light projected from the structured light projector. A coordinate system of the depth sensor matches a coordinate system of the camera. Herein, the camera will be referred to as a depth camera. The obtained depth image and color image, and a measured depth value of the depth sensor may be stored. The measured depth value of the depth sensor represents a depth or distance to 3D coordinates measured from the depth camera. The measured depth value may have a depth error because of assembly tolerances in production, temperature variation or vibration in transit of the depth sensor. In reality, there is a difference between an actual depth value and the measured depth value, which is the same as the depth error. The actual depth value may be obtained by correcting the measured depth in accordance with the exemplary embodiment.

The geometrical relation between the depth sensor and the color camera, and intrinsic parameters of each camera, may be calculated based on the obtained images. For calculation, any camera calibration method may be used, but the aspects of the disclosure are not limited thereto. In addition, the geometrical relation between the target object and each camera may be calculated using the camera calibration method.

Thereafter, in 120, the geometrical relation between the projector and the depth camera is calibrated. In 130, the depth is corrected by calculating an accurate feature point on an image plane of the depth camera that corresponds to a feature point on an image plane of the projector, and then actual 3D coordinates are obtained. The actual 3D coordinates are obtained by correcting the 3D coordinates measured by the depth camera.

Figure 2:
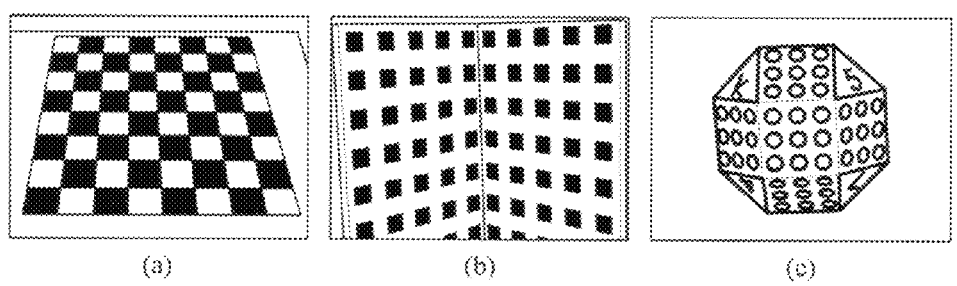
FIG. 2 is a diagram illustrating examples of a target object.

FIG. 2 is a diagram illustrating examples of a target object.

Referring to FIG. 2, the target object is a calibration object having at least one face. For example, the target object may be a polyhedron consisting of several triangles and rectangles, as shown in FIG. 2(C). The target object may have the same repetitive patterns on it. Herein, the exemplary embodiment will be described with focus on a calibration pattern as the target object.

Figure 3:
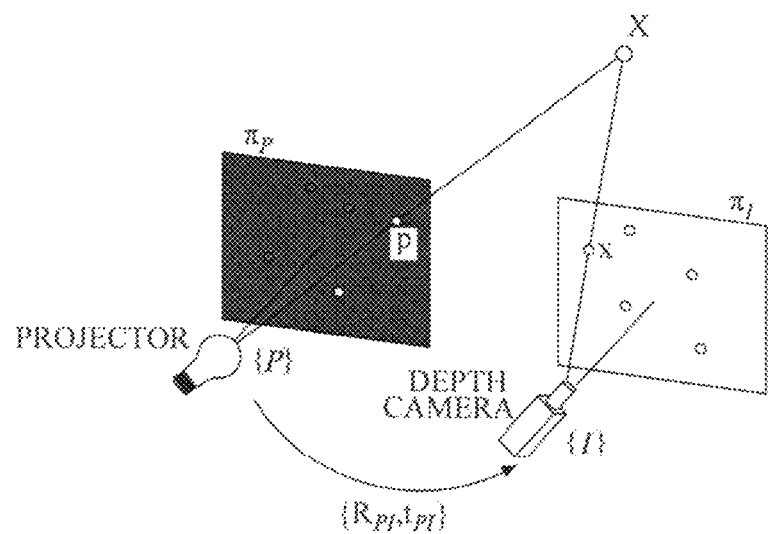
FIG. 3 is a diagram to show a measurement principle of a depth sensor using a projector and a depth camera.

FIG. 3 is a diagram to show measurement principle of a depth sensor using a projector and a depth camera.

Referring to FIG. 3, the depth sensor may include the projector and the depth camera, and the projector projects structured light, and the depth camera captures the structured light. The structured light may be infrared (IR) light, but aspects of the present disclosure are not limited thereto.

It is given that $\{P\}$ is a coordinate system of the projector, $\{I\}$ is a coordinate system of the depth camera, $\pi_P$ is an image plane of the projector, and $\pi_I$ is an image plane of the depth camera. Also, it is given that with respect to one point X in a 3D space, p represents an image point on $\pi_P$ and x represents an image point on $\pi_I$. It is provided that a rotation matrix and a translation vector between $\{P\}$ and $\{I\}$ are represented by $R_{PI}$ and $t_{PI}$, respectively. The depth sensor obtains 3D coordinates X, which is 3D information, through triangulation by extracting point x on $\pi_I$ that corresponds to point p on $\pi_P$.

To calculate accurate values of $R_{PI}$ and $t_{PI}$, point X (=[X, Y, Z]), which is in a 3D space that corresponds to one point x on $\pi_I$ onto which the calibration pattern is projected, is calculated using Equation 1 below.

$$X = [XYZ]^T = R_{PI}^T (ZK_I^{-1}[uv1]^T - t_{PI}) \quad (1),$$

where [u, v] represents image coordinates of point x, Z represents the depth value assigned to point x by the depth sensor, and $K_I$ represents an intrinsic parameter of the depth camera. And, [u, v, 1] is an augmented vector by adding 1 for matrix calculation, and $[u, v, 1]^T$ is a transposed matrix of [u, v, 1].

Rotation matrix $R_{PI}$ and translation vector $t_{PI}$ may be defined as Equation 2 and Equation 3, respectively.

$$R_{PI} = I_{3 \times 3} \quad (2)$$

$$T_{PI} = [75 \text{ mm } 0 0]^T \quad (3)$$

In equation 3, 75 mm is a distance between the projector and the depth camera, and this value may vary according to user settings.

Point p on $\pi_P$ corresponding to point X is calculated by Equation 4 below.

$$P = [X/Z \; Y/Z]^T \quad (4)$$

Plane $\pi_I$ to which point x belongs and the calibration pattern is projected may be obtained based on the geometrical relation between the camera and the calibration pattern, which is calculated using the camera calibration method. Given that a distance from the origin of $\{I\}$ to the plane is denoted by d and a unit norm vector of a plane with respect to $\{I\}$ is denoted by N, a planar homography $H_{Pi}$ is obtained using Equation 5 below.

$$H_{Pi} = K_i \left( \overline{R}_{Pi} + \frac{1}{d} \bar{t}_{Pi} N^T \right), \quad (5)$$

where rotation matrix $\overline{R}_{PI}$ and translation vector $\bar{t}_{PI}$ represent true values of rotation matrix $R_{PI}$ and translation vector $t_{PI}$, respectively, and they are variables. Since there may be many points on plane $\pi_I$ that overlap the calibration pattern, the points hereinafter will be represented by $x_i$, rather than x, and point p corresponding to x will be represented by $p_i$, accordingly. New corresponding points $\overline{x}_i$, with respect to $p_I$ are calculated using Equation 6 below.

$$\overline{x}_i = [a/b \; c/b] \quad (6),$$

where a, b, and c may be obtained using $H_{Pi}$ of Equation 5.

$$[a \; b \; c] = H_{Pi} \begin{bmatrix} P_i \\ 1 \end{bmatrix} \quad (7)$$

Here, when $\overline{R}_{PI}$ and $\bar{t}_{PI}$ n are correct values, new corresponding points $\overline{x}_i$ of points $p_i$ may be correctly calculated.

Figure 4:
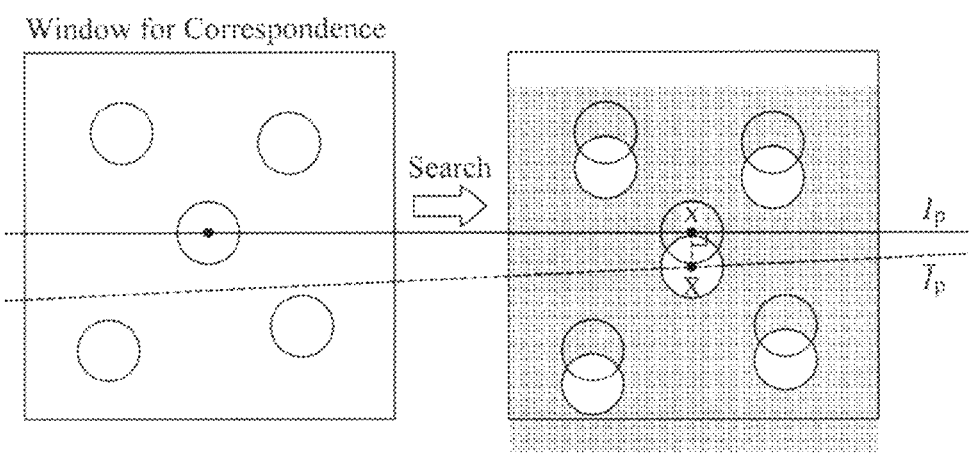
FIG. 4 is a diagram illustrating an example of epipolar lines and points to explain the concept of searching a correct corresponding point.

FIG. 4 is a diagram illustrating an example of epipolar lines and points to explain the concept of searching a correct corresponding point.

Referring to FIG. 4, a depth sensor finds $x_i$ on an epipolar line $l_P$ as a corresponding point of point $p_i$. However, the epipolar line $l_P$ is not correct due to a calibration error, and thus the found corresponding point is inevitably incorrect. A correct corresponding point lies on a correct epipolar line $\bar{l}_P$, and corresponding point $x_i$ found by the depth sensor is the nearest point to the correct corresponding point $\overline{x}_i$ among points lying on the epipolar line $l_P$. Therefore, if $\overline{x}_i$ is $(\overline{u}_i, \overline{v}_i)$ and x is $(u_i, v_i)$, it should be concluded that $u_i = \overline{u}_i$, as shown in FIG. 4.

As obtained from Equation 5 and Equation 6, $\overline{x}_i$ and $\overline{u}_i$ reflect variables $\overline{R}_{Pi}$ and $\bar{t}_{Pi}$. Then, optimal $\overline{R}^{PI}$ and $\bar{t}_{PI}$ may be calculated using Equation 8 that minimizes a cost function with respect to $\overline{R}_{PI}$ and $\bar{t}_{PI}$.

$$\min_{\overline{R}_{Pi}, \bar{t}_{Pi}} \sum_{i=1,\ldots,N} \|u_i - \overline{u}_i\|^2, \quad (8)$$

where N denotes the number of points x. Any nonlinear optimization methods that have been developed in optimization field can be used for minimizing the cost function. For example, the optimization of the cost function may be performed using Levenberg-Marquardt algorithm.

$\overline{R}_{PI}$ and $\bar{t}_{PI}$ are obtained by correcting $R_{PI}$ and $t_{PI}$, and a depth value given by the depth sensor may be corrected using $\overline{R}_{PI}$ and $\bar{t}_{PI}$. Hereinafter, a method for correcting a depth value corresponding to an arbitrary point $x_i$ on $\pi_I$ will be described. With respect to xI, pI on $\pi_P$ is calculated using Equation 1 and Equation 4. By using $p_i$ and the obtained $\overline{R}_{PI}$ and $\bar{t}_{PI}$, an epipolar line $\bar{l}_P$ on $\pi_I$ can be obtained. Given that coordinates of $x_i$ is $(u_i, v_i)$, since $u_i = \overline{u}_i$, a point $\overline{x}_i$ whose horizontal coordinate is u, can be obtained among points on $I_P$. A new point in a 3-dimension can be computed by triangulation with p, $\bar{x}_t$, $\bar{R}_{PI}$, $\bar{t}_{PI}$, and $K_I$, and this computed new point is a result of correction.

FIG. 5 is a diagram illustrating an image processing apparatus according to an exemplary embodiment.

Referring to FIG. 5, the image processing apparatus 5 includes a receiver 52, a processor 54, and a storage 56. The receiver 52 obtains a depth image of a target object obtained by a depth camera of a depth sensor and a color image of the target object obtained by a color camera.

The processor 54 calibrates a geometrical relation between a projector and the depth camera, which are included in the depth sensor, based on the obtained images, and corrects a depth of the depth sensor by computing correct feature points on an image plane of the depth camera that correspond to feature points on an image plane of the projector. In one example, the processor 54 may include a first calculator 541, a second calculator 542, and a third calculator 543.

The first calculator 541 calculates a feature point on the image plane of the projector that corresponds to a feature point with a predetermined depth value on the image plane of the depth camera. In one example, the first calculator 541 may calculate 3D coordinates corresponding to the feature point on the image plane of the depth camera. Then, a feature point on the image plane of the projector to which the calculated 3D coordinates are projected is computed. By using intrinsic parameters of the depth camera, and a rotation matrix and a translation vector that represent a relative position between the projector and the depth camera, the 3D coordinates may be calculated.

The second calculator 542 calculates a correct feature point on the image plane of the depth camera that corresponds to the feature point on the image plane of the projector that is calculated by the first calculator 541 when structured light is projected from an estimated correct position of the projector.

In one example, the second calculator 542 calculates a rotation matrix correction value and a translation vector correction value. Then, a corrected epipolar line on the image plane of the depth camera is obtained using the calculated rotation matrix correction value, the calculated translation vector correction value, and the feature point on the image plane of the projector that has been computed by the first calculator 541. Then, a new feature point is searched on the corrected epipolar line based on the rotation matrix correction value and the translation vector correction value, wherein the new feature point is a correct feature point on the image plane of the depth camera that corresponds to the feature point on the image plane of the projector.

In one example, the second calculator 542 calculates an optimal rotation matrix correction value and an optimal translation vector correction value that minimize a cost function that indicates a difference between the correct feature point on the corrected epipolar line on the image plane of the depth camera and a previous feature point on the epipolar line before correction. In other words, the second calculator 542 searches the corrected epipolar line of the image plane of the depth camera for a point whose horizontal pixel coordinate is the same as a horizontal pixel coordinate of the calculated feature point on the epipolar line before correction, and determines the found point as the correct feature point. The found point is an intersection between the corrected epipolar line and the perpendicular line of the feature point on the epipolar line before correction.

The third calculator 543 calculates an actual depth value with respect to the correct feature point on the image plane of the depth camera that has been calculated by the second calculator 542. In one example, the third calculator 543 may calculate the actual depth value and the actual 3D coordinates with respect to the correct feature point on the image plane of the depth camera by triangulation with the calculated feature point on the image plane of the projector, the calculated correct feature point on the image plane of the depth camera that corresponds to the calculated correct feature point on the image plane of the projector, the rotation matrix correction value, the translation vector correction value, and the intrinsic parameters of the depth camera.

The storage 56 stores the depth image obtained by the depth sensor, the color image obtained by the color camera, various information calculated by the processor 54, and information needed by the processor 54 for calculation.

According to the exemplary embodiments described above, when images of a target object are obtained using both a depth sensor and a color camera simultaneously, an error occurring in an obtained depth from the depth sensor may be accurately corrected, thereby making it possible to increase camera precision, where the error is caused by assembly tolerance in production of the depth sensor, temperature variation or vibration in transit of the depth sensor, or the like.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing method for calibrating a depth of a depth sensor, the image processing method comprising:

obtaining a depth image of a target object captured by the depth sensor and a color image of the target object captured by a color camera;

calibrating a geometrical relation between a projector of the depth sensor and a depth camera based on the obtained depth image and the color image; and calibrating a depth of the depth sensor by calculating a correct feature point on an image plane of the depth camera that corresponds to a feature point of an image plane of the projector, wherein the calibrating of the depth of the depth sensor comprises:

calculating the feature point on the image plane of the projector that corresponds to a feature point with a predetermined depth value on the image plane of the depth camera, calculating the correct feature point of the image plane of the depth camera that corresponds to the feature point of the image plane of the projector that is calculated by a first calculator when structured light is projected from an estimated correct position of the projector, and calculating an actual depth value of the calculated correct feature point on the image plane of the depth camera, and wherein the calculating of the correct feature point on the image plane of the depth camera comprises:

calculating a rotation matrix correction value and a translation vector correction value, calculating a corrected epipolar line on the image plane of the depth camera using the calculated feature point on the image plane of the projector, the calculated rotation matrix correction value, and the calculated translation vector correction value, and searching for a new feature point on the corrected epipolar line based on the rotation matrix correction value and the translation vector correction value, wherein the new feature point corresponds to the correct feature point on the image plane of the depth camera that corresponds to the feature point on the image plane of the projector.

2. The image processing method of claim 1, further comprising:

computing a homography, and calculating the rotation matrix correction value and the translation vector correction value which minimize a cost function.

3. The image processing method of claim 2, wherein the homography is computed using the rotation matrix correction value and the translation vector correction value, and the correct feature point on the image plane of the depth camera is obtained by multiplying the calculated feature point on the image plane of the projector by the homography.

4. The image processing method of claim 2, wherein the calculating of the rotation matrix correction value and translation vector correction value which minimize the cost function comprises calculating an optimal rotation matrix correction value and an optimal translation vector correction value that minimize a cost function that represents a difference between a correct feature point on the corrected epipolar line on the image plane of the depth camera and a feature point on an epipolar line before correction.

5. The image processing method of claim 1, wherein the searching of the new feature point on the image plane of the depth camera comprises searching the corrected epipolar line on the image plane of the depth camera for a point to be found whose horizontal pixel coordinate is the same as a horizontal pixel coordinate of a feature point on an epipolar line before correction, and then determining the found point as the correct feature point; and the found point is an intersection between the corrected epipolar line and a line including the feature point on the epipolar line and perpendicular to the epipolar line before the correction.

6. An image processing apparatus for calibrating a depth sensor, the image processing apparatus comprising:

a projector of the depth sensor configured to project structured light;

a depth camera comprising a color camera, the depth camera configured to capture the structured light and the color camera configured to capture a color image of a target object;

an image receiver, executed by a processor causing the processor to perform an image detector to obtain a depth image of the target object captured by the depth sensor and the color image of the target object captured by the color camera, wherein:

the processor is configured to calibrate a geometrical relation between the projector and the depth camera based on the obtained depth image and the color image, and to correct a depth of the depth sensor by calculating a correct feature point on an image plane of the depth camera that corresponds to a feature point of an image plane of the projector, wherein the processor comprises a first calculator configured to calculate a feature point on an image plane of the projector that corresponds to a feature point with a predetermined depth value on an image plane of the depth camera, a second calculator configured to calculate the correct feature point on the image plane of the depth camera that corresponds to the feature point on the image plane of the projector that is calculated by the first calculator when structured light is projected from an estimated correct position of the projector, and a third calculator configured to calculate an actual depth value and actual three-dimensional (3D) coordinates of the correct feature point on the image plane of the depth camera that has been calculated by the second calculator, and wherein the second calculator is configured to calculate a rotation matrix correction value and a translation vector correction value, calculate a corrected epipolar line on the image plane of the depth camera using the calculated rotation matrix correction value and translation vector correction value and the feature point on the image plane of the projector that has been calculated by the first calculator, and to search for a new feature point on the corrected epipolar line based on the rotation matrix correction value and the translation vector correction value, wherein the new feature point corresponds to the correct feature point on the image plane of the depth camera that corresponds to the feature point on the image plane of the projector.

7. The image processing apparatus of claim 6, wherein the second calculator is configured to calculate an optimal rotation matrix correction value and an optimal translation vector correction value that minimize a cost function that represents a difference between a correct feature point on the corrected epipolar line on the image plane of the depth camera and a feature point on an epipolar line before correction.

8. The image processing apparatus of claim 7, wherein the second calculator is configured to search the corrected epipolar line on the image plane of the depth camera for a point to be found whose horizontal pixel coordinate is the same as a horizontal pixel coordinate of the feature point on the epipolar line before the correction, and then determine the found point as the correct feature point on the corrected epipolar line; and the found point is an intersection between the corrected epipolar line and a line including the feature point on the epipolar line and perpendicular to the epipolar line before the correction.

* * * * *